Figure 1:
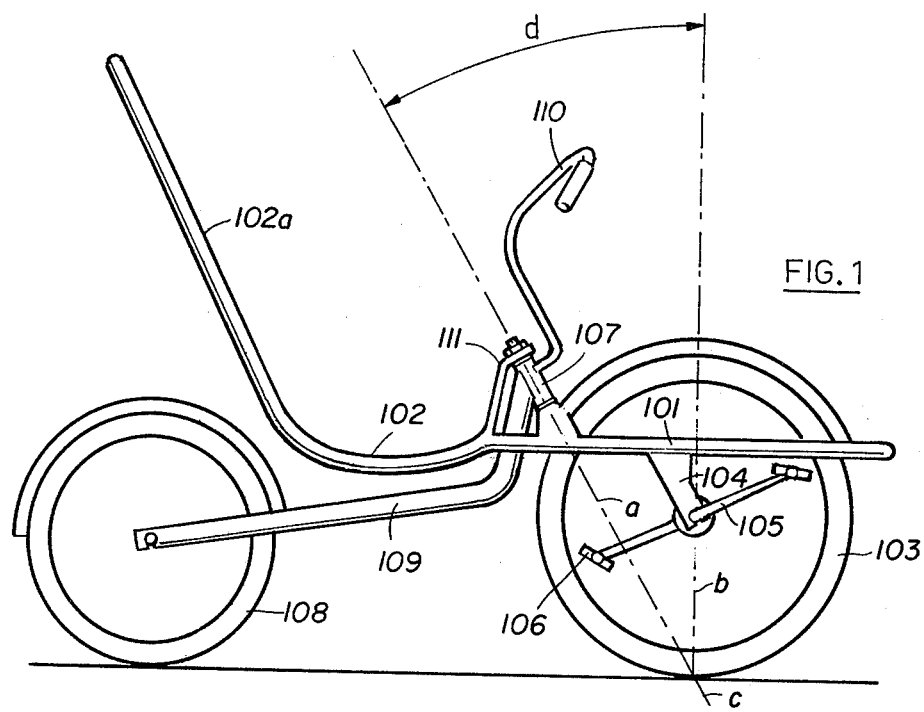

United States Patent [19]
Häggkvist

[11] 3,981,516
[45] Sept. 21, 1976

[54] BICYCLE AND TRICYCLE OF LOW WIND RESISTANCE AND OF LOW CENTER OF GRAVITY

[76] Inventor: Björn Häggkvist, Garvar Lundins Grand 7, Stockholm, Sweden

[22] Filed: Mar. 21, 1975

[21] Appl. No.: 560,953

[30] Foreign Priority Application Data

Mar. 29, 1974  Sweden...................................7404244

[52] U.S. Cl............................... 280/263; 280/282
[51] Int. Cl.².......................................... B62K 5/06
[58] Field of Search .......... 280/235, 240, 263, 266, 280/282

[56] References Cited
UNITED STATES PATENTS

| | | | |
|---|---|---|---|
| 228,996 | 6/1880 | Hosea | 280/263 X |
| 3,392,991 | 7/1968 | Ryan | 280/282 |
| 3,504,934 | 4/1970 | Wallis | 280/282 |
| 3,860,264 | 1/1975 | Douglas | 280/266 |

Primary Examiner—M. H. Wood, Jr.
Assistant Examiner—Terrance L. Siemens
Attorney, Agent, or Firm—Hammond & Littell

[57] ABSTRACT

The invention provides a light weight bicycle or tricycle of low wind resistance and low center of gravity principally composed of two frames over-lapping in tandem and joined by a journaled bearing. The front part of the front frame carries a bracket for the front wheel; the rear part of this frame is first depressed and then bent upwardly to provide a seat for the rider and a back rest. The rear frame largely extends under the rear part of the front frame and carries a rear bracket (or brackets) for the rear wheel (or wheels). The front of this frame is bent substantially vertically upwardly and is joined to the first frame by a bearing which engages an upwardly rearwardly slanted journal located at about the midpoint of the front frame. The vehicle is steered by a handlebar which turns the first frame relative to the second. The vehicle is propelled by conventional pedal or motor drive on the front wheel.

5 Claims, 3 Drawing Figures

BICYCLE AND TRICYCLE OF LOW WIND RESISTANCE AND OF LOW CENTER OF GRAVITY

BACKGROUND OF INVENTION

The most important weaknesses of perhaps the most successful exponent of pedal driven vehicles, viz. the conventional bicycle, can be considered to be the lack of comfort and the low speed obtainable in comparison with motorized vehicles. Both weaknesses are due to the driving power generated by the rider being low compared with the resistance of the air arising at increased speed and said power also being insufficient for the heavy vehicle weights as a result of efforts to improve the seating position of the rider or increase the comfort in other respects. The introduction of heavy equipment as power transmission devices, steering mechanisms, bodies etc. can be mentioned as examples in this respect.

OBJECT OF THE INVENTION

The present invention has for its object to improve vehicles of the kind referred to with respect to the comfort for the driver and the utilization of the power produced by the rider.

THE INVENTION

In the vehicles of the present invention the rider occupies a comfortable backward leaning seating position at a low height above the ground level, so that the air resistance of the vehicle, with rider, is about one half of the air resistance of a conventional bicycle rider, combination.

As the driving wheel has a favourable location on the second frame between the legs of the rider, the simplicity and efficiency of the power transmission will be the same as that of a conventional bicycle. Also the steering mechanism may have a particularly simple design, as the rider only needs to actuate the first frame, because the frame parts are pivoted relative each other. It is a very important feature that because of the simplicity of the power transmission and the steering mechanism the weight of the vehicle is very small.

Altogether this means that the present invention provides a vehicle with considerably improved comfort and substantially increased versatility with respect to the range of speed. At the same time as regards simplicity of design and small weight the vehicle is of equal merit with the conventional bicycle.

Additional advantages are further achieved by the design of the frame. Thus, in a simple way the comfort can be still further improved by making the connection of the frames at the steering link somewhat resilient.

The absence of a power transmission to the rear wheel or wheels permits an ample luggage-carrying device or a child's seat to be installed between two rear wheels in the first frame in case of a three wheeler embodiment.

The front part of the second frame can be provided with a protective hood, which, because of the small height of the vehicle and the seating position of the rider, can be given an attractive design in connection with good protective efficiency and simplicity.

Moreover, one and the same vehicle alternatively can be provided with a first frame to suit different transportation tasks, and special connections for quick assembly of the first and second frame can be employed.

Naturally a vehicle according to the present invention can be converted into a motorized vehicle by the introduction of a motor drive, by way of example a removable engine of the type used in light weight motor cycles.

The vehicle of the present invention is thus a vehicle comprising in combination a forward frame having a front wheel rotably mounted at a forward point thereof, a depressed middle seat part, and an upwardly inclined rear back rest part; a rear frame positioned in tandem below and partly behind said first frame, the forward part of said rear frame being being upwardly inclined, the front of said frame being pivotally joined to said forward frame at a point between the forward part of said seat part and the rear part of said front wheel, the journal of said pivot being rearwardly inclined at such angle that the axis thereof, extended downwardly, substantially intersects the point of said forward wheel which normally is in contact with the ground, at least one of said frames being longer than half the wheelbase of said vehicle; at least one rear wheel rotably mounted at a rear portion of said rear frame; means to pivot said frames relative to each other and thereby steer said vehicle; and drive means for said vehicle.

The vehicle thus places the rider in a position which provides the rider-vehicle combination with a low center of gravity.

Figure 2:
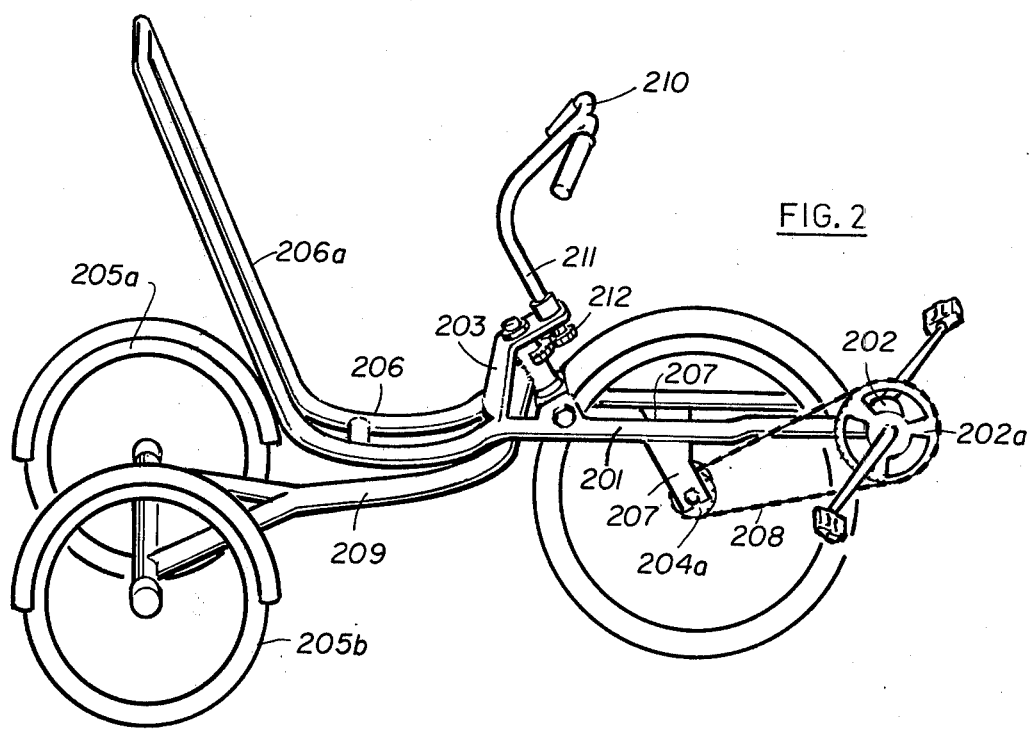
Figure 3:
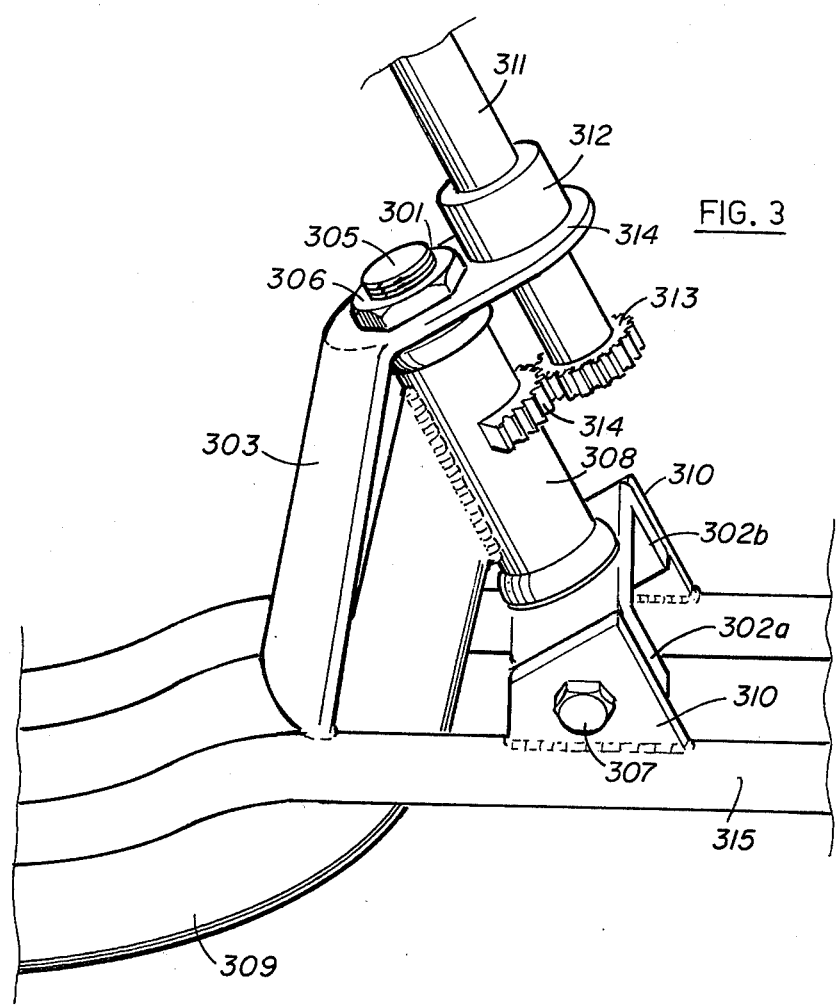

An embodiment of the invention will be described in the following, reference being made to the accompanying drawings, in which FIG. 1 is a diagrammatic side elevation of a bicycle according to the invention, FIG. 2 is a perspective view of a tricycle according to the invention as seen from the side, and FIG. 3 is a partly broken perspective view of the steering link mechanism shown in FIG. 2.

In the figures, the same numbers represent the same components. FIG. 1 illustrates a bicycle of the invention having a frame composed of parts 101 and 109. The middle portion of first or forward frame 101 is shaped as seat 102 for the rider. Front wheel 103 is rotably journalled in a front portion of said frame to locate the wheel conveniently between the legs of the intended rider. The wheel is journalled in brackets 104. Wheel 103 is provided with pedal crank 105 carrying pedals 106. Frame 101 is also provided with a steering link mechanism 107 positioned immediately forward of seat 102. The second or rear frame 109 carries rear wheel 108, and steering handle 110 is coupled to steering link mechanism 107 (described more in detail in connection with FIG. 3) thereby providing steering means.

FIG. 2 illustrates a tricycle of the invention having a forward frame 201 carrying front wheel 204 carrying toothed drive wheel 204a and rear frame 209 carrying two rear wheels 205 spaced a sufficient distance apart to provide desired stability. The rear portion of frame 201 is shaped to provide seat 206 with back 206a. Steering handle 210 is integral with steering bar 211 for turning the second frame part 209 to the left and to the right when required. Bar 211 is journalled in a sleeve attached to steering bracket 203 integral with frame 201. Bar 211 is coupled to rear frame 209 by means of steering link mechanism 212 (shown more in detail in FIG. 3). Front wheel 204 is journalled in brackets 207 of forward frame 201 and pedal crank 202 turning gear toothed wheel 202a is journalled into the frame at the extreme forward end thereof (i.e., just in front of front wheel 204). Transmission chain 208 engages toothed wheels 202a and 204a to transmit rotational movement from crank 202 to the hub of wheel 204.

FIG. 3 illustrates a steering link mechanism suitable for use in vehicle of the present invention comprising upright shaft or journal 305 having threaded top portion 301 and at its bottom portion transverse pair of attachment ears 302a and 302b. Shaft 305 is at its top secured to a forwardly bent portion 304 of steering bracket 303 by means of nut 306 and at its lower portion to upstanding lugs 310 by means of a bolt 307. Lugs 310 are integral with forward frame 315. Steering link sleeve 308 is journalled on shaft 305, said sleeve being integral with the front end of the second frame part 309 which in turn carries the rear wheel or wheels.

As described in connection with FIGS. 1 and 2, the steering means comprise a steering handle and a steering bar 311 journalled in sleeve 312 which is fixed to portion 304. Gear wheel 313 is mounted at the bottom of bar 311, and meshes with toothed annular segment 314 on sleeve 308 of rear frame 309. When the vehicle is steered by means of the steering mechanism, frames 309 and 315 pivot relative to each other around the center axis of shaft 305.

As the steering link mechanism, which may partly or wholly be enclosed by a housing or shield, is located between the forward part of the seat portion of the front frame and front wheel 103, seat 102 of forward frame 101 has a lowered position relative to said mechanism. The rider's center of gravity thus lies near the ground and this enhances the stability of the vehicle and lowers the air resistance thereof. Owing to the location of the steering link mechanism close to the rider's seat, steering handles 110 and 210 act directly upon the said mechanism without requiring any extended steering movement transmission from said handle to the rear wheels. A line through the center of the journal of the steering mechanism passes through the point at which the front wheel in normal use is in contact with the ground.

It will be noted that in FIGS. 1, 2 and 3, brackets 111, 203 and 303 are each positioned so that one leg is substantially vertical and so that the other leg is at about right angles to the axis of the pivot journal.

As the steering link is enclosed in a steering link housing located between the forward part of the rider's seat and the rear part of the front wheel the part of the forward frame comprising the seat of the rider will be lower than to the steering link. This causes a low centre of gravity and a low air resistance.

Because the steering link and the steering link housing are close to the seat of the rider, the steering handle can also act directly upon the steering link without any transmissions of steering movements from the steering handle to the rear wheel, which are necessary features in connection with rear wheel steered bicycles. The steering link has a backwards inclined position in the longitudinal plane of the vehicle with an angle d between the centre line of the link and a vertical line, and in addition thereto in such a manner that the centre line of the link falls within the bearing surface of the front wheel against the ground as is shown by the intersection at point c of dotted lines a and b of FIG. 1. The axis of the journal bearing, downwardly projected, thus intersects the point at which wheel 103 or 204 normally contacts the ground.

By the inclination of the link the rear portion of the forward frame together with part of the rider is lifted during the pivoting movement in connection with a steering deflection. The lifted up mass, which under certain geometrical conditions can be great, will consequently tend against a steering deflection and make the vehicle directionally stable.

Moreover, by the inclination of the link, the whole second frame together with the rider will get an inclination in inwards direction towards the centre of the curve, which reduces the tilting tendency caused by the centrifugal force.

The invention is not limited to the embodiment described above and illustrated in the drawings. Thus, the rider can actuate the front wheel directly without any chain transmission and in such a case it will not be necessary to incorporate a crank case in the frame.

Moreover, the frame can be designed in such a manner that the vehicle will be of the two wheeler type. The rear portion of the first frame then can carry a fork for a wheel. The steering mechanism does not need to be equipped with a gear, but the steering handle can comprise a fixed part of the first frame by way of example an upwards extending prolongation of link sleeve 8.

It should be understood, that the shaping of said forward frame may vary. It must have a width at its rear part to obtain comfortable seatposition for the driver. At least one of the frames, preferably said forward frame, has a total length exceeding half the wheel base.

From the drawing it is obvious that the rear frame along a part of its length extends on a lower level than said forward frame. The total length of said rear frame can vary within great limits, permitting different wheel base lengths. It is not necessary for the front and rear wheels to have different diameters.

What I claim is:

1. A vehicle comprising in combination a forward frame having a front wheel rotably mounted at a forward point thereof, a depressed middle seat part, and an upwardly inclined rear back rest part; a rear frame positioned in tandem below and partly behind said first frame, the forward part of said rear frame being upwardly inclined, the front of said rear frame being pivotally joined to said forward frame at a place in said forward frame which is between the forward part of the seat part of said frame and the rear part of the front wheel of said vehicle, said pivot being inclined at such angle that the axis thereof, extended downwardly, substantially intersects the point of said forward wheel which normally is in contact with the ground, at least one of said frames being longer than half the wheelbase of said vehicle; at least one rear wheel being rotably mounted at a rear portion of said rear frame; means to pivot said frames relative to each other and thereby steer said vehicle; and drive means for said vehicle.

2. A vehicle according to claim 1 wherein said forward first frame carries at a point between the forward limit of said seat and the rear part of said wheel a bracket one leg of which is substantially vertical and the other leg of which is substantially at right angles to line a of FIG. 1.

3. A vehicle to claim 1 wherein said forward frame extends beyond said front wheel, and pedal means adapted to drive said front wheel are connected to said frame at a point forward of said front wheel.

4. A vehicle according to claim 1 having a pair of rear wheels.

5. A vehicle according to claim 1 wherein said seat part is lower than the point at which said rear frame and said forward frame are joined.

* * * * *